United States Patent
Wilson

(10) Patent No.: US 8,152,099 B2
(45) Date of Patent: Apr. 10, 2012

(54) METHOD OF LANDING AN AIRCRAFT AND APPARATUS THEREFOR

(75) Inventor: Fraser Wilson, Filton (GB)

(73) Assignee: Airbus Operations Limited, Bristol (GB)

( * ) Notice: Subject to any disclaimer, the term of this patent is extended or adjusted under 35 U.S.C. 154(b) by 1501 days.

(21) Appl. No.: 10/497,317

(22) PCT Filed: Dec. 3, 2002

(86) PCT No.: PCT/GB02/05433
§ 371 (c)(1),
(2), (4) Date: Jun. 2, 2004

(87) PCT Pub. No.: WO03/047968
PCT Pub. Date: Jun. 12, 2003

(65) Prior Publication Data
US 2005/0017128 A1    Jan. 27, 2005

(30) Foreign Application Priority Data

Dec. 7, 2001   (GB) .................................. 0129300.0

(51) Int. Cl.
*B64C 25/40* (2006.01)
(52) U.S. Cl. .................................................. 244/103 S
(58) Field of Classification Search ............... 244/103 S, 244/102 R, 100 R
See application file for complete search history.

(56) References Cited

U.S. PATENT DOCUMENTS

| | | | | |
|---|---|---|---|---|
| 2,063,032 A | * | 12/1936 | Fator | 244/103 S |
| 2,480,651 A | * | 8/1949 | Hawkins et al. | 244/103 S |
| 3,056,567 A | * | 10/1962 | Smith et. al. | 244/103 S |
| 3,236,338 A | * | 2/1966 | Mayer | 188/270 |
| 3,936,016 A | * | 2/1976 | Shiber | 244/103 S |
| 4,007,970 A | | 2/1977 | Romero | |
| 4,404,633 A | | 9/1983 | Goicoechea | |
| 4,580,744 A | | 4/1986 | Guichard | |
| 4,659,040 A | * | 4/1987 | Sinclair | 244/103 S |
| 5,024,491 A | | 6/1991 | Pease, Jr. et al. | |
| 5,746,393 A | * | 5/1998 | Gennaro | 244/103 S |
| 6,086,017 A | * | 7/2000 | Al-Thani | 244/103 S |

* cited by examiner

*Primary Examiner* — Tien Dinh
(74) *Attorney, Agent, or Firm* — Nixon & Vanderhye P.C.

(57) ABSTRACT

A method of landing an aircraft having wheels includes causing the aircraft to land in a manner that causes the wheels to have a spin-up phase on contact with the landing surface during landing. A braking force is applied immediately after the wheels touch the runway so as to reduce, or delay the start of, the spin-up of the wheels. The braking force is, for example, applied using the same braking system as used conventionally to decelerate the aeroplane on landing. The peaks, over time, of the vertical wheel to ground loads ($L_V$) and the horizontal drag loads ($L_H$) caused by friction between the tires of the wheels of the aircraft and the ground can be decoupled, or separated, such that the maximum total load, owing to the combination of the vertical loads ($L_V$) and the drag loads ($L_H$), sustained by the aircraft during landing is reduced (compared with peak 8).

12 Claims, 3 Drawing Sheets

METHOD OF LANDING AN AIRCRAFT AND APPARATUS THEREFOR

This application is the US national phase of international application PCT/GB02/05433 filed in English on 3 Dec. 2002, which designated the US. PCT/GB02/05433 claims priority to GB Application No. 0129300.0 filed 7 Dec. 2001. The entire contents of these applications are incorporated herein by reference.

The present invention relates to an aircraft and a method of landing an aircraft. In particular, the present invention relates a) to a method of landing an aircraft having wheels, for example landing gear wheels, in circumstances where the wheels have a spin-up phase on contact with a surface on which the aircraft lands, b) to such an aircraft, c) to a control system therefor, and d) to a method of converting an existing aircraft to such an aircraft.

When an aircraft lands, the aircraft is subjected to various loads including vertical wheel to ground loads and horizontal drag loads including, for example, loads caused by friction between the tyres of the wheels of the aircraft and the ground. Components of the aircraft, for example the landing gear, have to be carefully designed in order for the aircraft to be able to withstand such loads, and other operational loads, but without unduly increasing the mass of the aircraft.

It would therefore be desirous to be able to operate an aircraft, or to adapt an aircraft, in such a way as to reduce the maximum loads that a given aircraft component must be able to withstand safely when the aircraft lands.

It is an object of the present invention to provide a method of landing an aircraft that enables the maximum forces sustained by the aircraft during landing to be reduced and also to provide an aircraft able to perform such a method of landing.

The present invention provides a method of landing an aircraft having wheels enabling the aircraft to land on a landing surface, the method being performed in a manner that causes the wheels to have a spin-up phase on contact with the landing surface during landing, wherein the method includes a step of applying a braking force to the wheels during landing so as to reduce, or delay the start of, the spin-up of the wheels.

We have ascertained that applying a braking force to wheels of an aircraft on landing (to delay or reduce the spin-up phase) can actually reduce the maximum loads experienced by the aircraft as compared to a method of landing where no such braking forces are applied to the wheels. Such a notion might at first appear counter-intuitive. By way of example only, analysis illustrating how such a surprising advantage might result from the method of the invention will now be provided.

During a conventional landing method, both i) the vertical wheel-to-ground loads and ii) the horizontal drag loads (resulting from the loads caused by friction between the tyres of the wheels of the aircraft and the ground) peak soon after the wheels of the aircraft come into contact with the ground, for example, the surface of a runway. Typically, those peaks (the instants of greatest load on the aircraft) occur simultaneously (or at least very close together) and thus the total load, owing to the combination of the vertical loads and the horizontal drag loads, sustained by the aircraft during landing also peaks. The horizontal drag force caused by the friction between the tyres and the runway is relatively low at high slip, but increases as the amount of slip reduces. Thus, reducing the rate at which spin-up occurs, or delaying the start of the spin-up phase, by braking the wheels can actually reduce the drag caused by friction between the tyres and the runway at the time when the vertical wheel to ground loads peak after the wheels touch the runway. As a consequence, the instant at which the maximum horizontal drag force is reached can be delayed by reducing or delaying spin-up. The instant at which the maximum vertical forces are incurred is not greatly affected by applying the brakes during or before spin-up. Thus the peaks of the vertical loads and the horizontal drag loads can be decoupled, or separated, such that the maximum total load (owing to the combination of the vertical loads and the drag loads) sustained by the aircraft during landing is reduced. It will be appreciated that the above analysis, being by way of example, somewhat simplifies the very complicated physical processes and interactions thereof involved during landing of an aircraft.

It will be appreciated that the aircraft may have further wheels enabling the aircraft to land on the landing surface, wherein the step of braking is not performed on those further wheels. For example, the aircraft may include a nose wheel in respect of which the step of braking according to the above defined method is not performed. The method of the present invention may be considered as being performed during a period starting immediately before the wheels touch the landing surface and ending after the spin-up phase of the wheels has completed.

The step of applying a braking force may be performed immediately after the wheel touches the landing surface on landing. Preferably, however, the step of applying a braking force is started before the wheels touch the landing surface on landing.

The step of applying a braking force is performed such that the braking force is applied, during contact of the wheels with the landing surface, for a period of preferably more than 10% and less than 50% of the total time required, absent such braking, for completion of the spin-up phase. The aircraft in respect of which the method is of particular advantage are such that the spin-up phase of the wheels on landing typically lasts for 0.1 to 0.7 seconds. Thus, the period of braking preferably lasts between 0.01 and 0.35 seconds, and more preferably lasts between 0.02 seconds and 0.2 seconds.

During the step of applying a braking force, there is preferably a period of time when the braking force applied is progressively reduced. Thus, at a given time after the step of braking has commenced, the braking force is preferably continuously reduced until no braking is actively applied. The braking force may be ramped down at the end of the braking step, for example. Preferably, however, the braking force is progressively reduced, preferably at a substantially constant rate, as soon as spin-up starts, or immediately thereafter. During the step of applying a braking force, there may be a period of time when the braking force applied is progressively increased. For example, the step of braking may be commenced by continuously increasing the braking force actively applied from zero. It is preferred however that the braking force is only reduced during spin-up of the wheels.

The method advantageously enables the timing of the forces sustained by the aircraft due to drag between the wheels and the landing surface to be controlled in relation to the timing of other forces sustained by the aircraft during landing. Those other forces may include for example those loads imposed on the aircraft that result from the change of vertical momentum of the aircraft on landing. For example, the first peak of the loads due to the total drag between the wheels and the landing surface is advantageously caused to occur sufficiently later than the occurrence of the first peak of the vertical ground-to-wheels loads, such that the peaks are effectively decoupled (as compared to the case in the prior art where the peaks occur substantially simultaneously). The step of applying a braking force to reduce, or delay the start of, the spin-up of the wheels is preferably performed such that at the instant when the force, due to the total drag between the wheels and the landing surface, sustained by the aircraft reaches its first peak, the vertical ground to wheels load sustained by the aircraft is below 95%, preferably below 90% and more preferably below 85%, of its maximum value prior to that instant.

The method preferably includes a step in which the aircraft speed is reduced to taxiing speed, such a step being performed in a conventional manner, including a step of braking the wheels for example. The braking forces applied during the step of reducing/delaying spin-up are preferably, by way of comparison, no greater than about half of the maximum braking forces applied during conventional braking when decelerating the aircraft. Thus, the method preferably includes a step in which the aircraft is decelerated by applying a braking force after the spin-up phase has been completed and the maximum braking force applied during that step is greater than twice the maximum braking force applied during the step of applying a braking force to reduce, or delay the start of, the spin-up of the wheels. The braking force applied during the step to reduce, or delay the start of, the spin-up of the wheels is preferably greater than 10%, more preferably greater than 20% of the maximum braking force applied to decelerate the aircraft after the spin-up phase has been completed.

The brakes used during the step of reducing/delaying the spin-up of the wheels may, but need not necessarily, be the same brakes that are applied when decelerating the aircraft after the spin-up phase has been completed. Thus, the step of applying a braking force is preferably effected by a braking system provided for decelerating the aircraft on landing and the method includes a further step in which after the wheel spin-up phase has been completed the braking system applies a further braking force to the wheels, which aids the deceleration of the aircraft. Alternatively, the aircraft may include a first braking system for use during the step of delaying/reducing spin-up and a second braking system, that is separate and independent of the first, for decelerating the aircraft after the spin-up phase.

The step of applying a braking force to reduce, or delay the start of, spin-up of the wheels is advantageously performed automatically by a suitably arranged control system.

The aircraft may have landing gear of the trailing link gear type having front and rear axles for front and rear wheels respectively. In such a case, during the spin-up phase the respective forces sustained by the aircraft due to the drag between the landing surface and the wheels on the front and rear axles reach a maximum at a first time and at a second time, respectively. Without applying a braking force during or before spin-up the first and second times may be substantially equal. We have found that, as an extra benefit, by performing the method of the invention the first time can be caused to be significantly different from the second time and can therefore lead to the decoupling of the first peaks of the drag forces caused by the wheels on the front and rear axles. The benefit may arise, especially in the case where the landing gear is of the trailing link gear type, even if the braking applied to the front and rear wheels is identical. The decoupling of the peaks may be improved further by braking the front wheels in a different manner to the braking of the rear wheels, preferably to cause the front and rear wheels to spin-up at different rates. Decoupling the peaks can lead to the maximum total drag force due to the combination of the loads caused by the front and rear wheels being reduced. The step of applying a braking force to reduce, or delay the start of, the spin-up of the wheels is advantageously performed such that there is a greater than 10% difference in the first and second times, and more preferably such that there is a greater than 20% difference in the first and second times.

The present invention further provides an aircraft including
 wheels enabling the aircraft to land on a landing surface,
 brakes able to apply a braking force to the wheels, and
 a control system for controlling the braking force so applied, wherein
 the aircraft is designed to land in a manner that causes the wheels to have a spin-up phase on contact with the landing surface during landing, and the control system is arranged so that during landing the control system causes the brakes to apply a braking force to the wheels so as to reduce, or delay the start of, the spin-up of the wheels.

The brakes are preferably in the form of conventional brakes used to decelerate the aircraft during landing or may, alternatively, comprise additional independent brakes.

The control system is advantageously connected to a sensor able to detect the wheel-to-ground loads sustained by at least one of the wheels, thus enabling the control system to judge when the wheels start spinning up (for example, by monitoring the wheel-to-ground loads and detecting when the measured load exceeds a threshold indicative of a reaction force between the wheels and the landing surface sufficient to cause spin-up), and preferably control the application of the brakes in response to the detected start of spin-up of the wheels.

The aircraft is advantageously arranged to be able to land in accordance with the method as defined above with reference to the present invention. For example, the aircraft may include landing gear of the trailing link gear type having front and rear axles, wherein during the spin-up phase the respective forces sustained by the aircraft due to the drag between the landing surface and the wheels on the front and rear axles reach a maximum at a first time and at a second time, respectively, and wherein the control system is arranged to apply a braking force such that there is a greater than 10% difference in the first and second times.

The present invention also further provides a control system for an aircraft, the control system being connectable to a brake system of an aircraft so as to convert the aircraft to an aircraft as defined above with reference to the present invention.

The present invention yet further provides a method of converting an existing aircraft to an aircraft as defined above with reference to the present invention, the existing aircraft including a landing procedure control system connectable to the existing brake system of that aircraft, the method of converting including the steps of converting the landing procedure control system to a control system as defined above with reference to the present invention.

The invention is described further, by way of example, with reference to the accompanying purely schematic drawings, of which:

Figure 1:
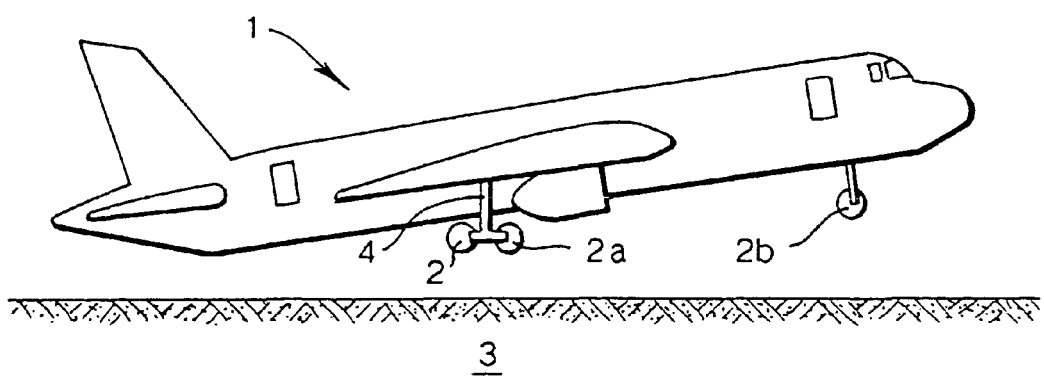
FIG. 1 shows a schematic side view of an aircraft landing on a runway.

FIG. 1 shows an aircraft 1 with wheels 2 landing on a runway 3. The aircraft 1 lands with a significant horizontal velocity. Immediately before contact with the runway 3 the wheels 2 have zero or negligible angular velocity (i.e. the wheels are not rotating). The aircraft 1 has two sets of main landing gear 4 (only one of which is shown in FIG. 1) each comprising four wheels 2a (only two of which are shown) and has further landing gear including two nose wheels 2b (only one of which is shown). On landing, the wheels 2a of the main landing gear 4 touch the runway first and withstand much greater loads during landing than the nose wheel 2b.

The landing gear loads sustained during a conventional method of landing will now be described with reference to FIGS. 2a to 2c.

Figure 2A:
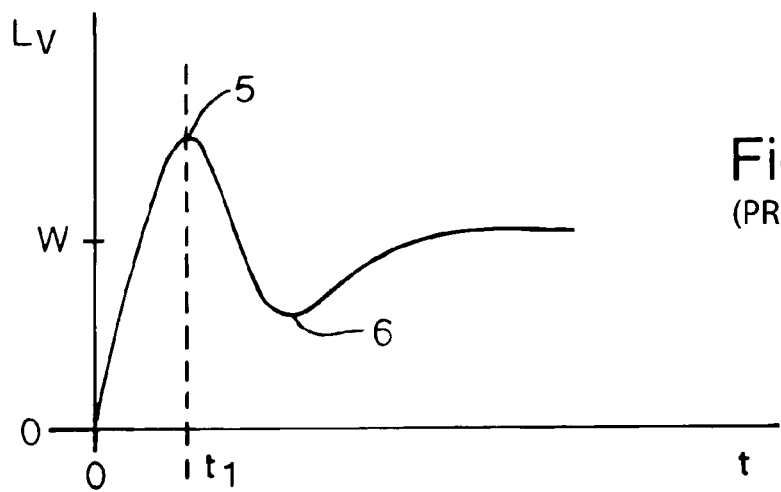
FIGS. 2a to 2c are graphs, which schematically show the loads sustained by the aircraft during landing in a conventional manner.

FIG. 2a shows the vertical ground-to-wheel loads, $L_V$, as sustained by each of the two main landing gear 4 against time, t. FIG. 2b shows the horizontal drag loads, $L_H$, caused by friction between the tyres of the wheels 2a of the main landing gear 4 and the surface of the runway 3, against time, t. FIG. 2c shows a notional total load, $L_T$, representative of the combination of the loads $L_H$, $L_V$ sustained by the main landing gear 4, against time, t. All of the graphs showing the loads $L_V$, $L_H$ and $L_T$ are drawn with the vertical axis representing the load sustained by the landing gear and the horizontal axis representing time. As a result of the horizontal and vertical loads, various components of the landing gear will be subjected to various moments (some depending on the relative positioning of the components of the landing gear at a given time, for example, being dependent on the length of the landing gear shock absorbers which contract as time progresses). It will be understood that it is these moments that are taken into account when designing landing gear and that the notional total load $L_T$ as illustrated in the Figures and described hereafter is merely a simple combination of the magnitudes of the horizontal and vertical loads (the square root of the sum of their squares) to aid the explanation of the advantages provided by the method of the present embodiment.

Initially (at time t=0), the wheels 2a of the main landing gear 4 contact the surface of the runway 3. The vertical load $L_V$ quickly rises as the vertical momentum of the aircraft 1 is reduced. The vertical load $L_V$ peaks (peak 5) at time $t_1$, which in the present example is at about 0.5 seconds after the initial contact of the wheels 2a with the runway 3. The peak load is equivalent to a force of about 1.2 g times the mass M (or 11.8 M with g being taken as being equal to 9.8 ms$^{-2}$) of the aircraft 1 (that is 0.6 g times the mass M for each of the two main sets of landing gear 4). The resilience in the landing gear 4 and the components thereof is such that, after the peak 5 of the vertical ground-to-wheel loads $L_V$, the load $L_V$ decreases to a load below the level w equivalent to the vertical load at rest of the aircraft 1, the load $L_V$ then eventually levelling out, after a trough 6 rising gradually and thereafter tending towards a steady state where the vertical load $L_V$ is equal to the resting vertical load w (i.e. a force equal to Mg) of the aircraft 1. (The landing gear is designed to be able to withstand a static load of about 1.7 Mg, but such loads are rarely encountered during normal operation of the aircraft 1.)

Figure 2B:
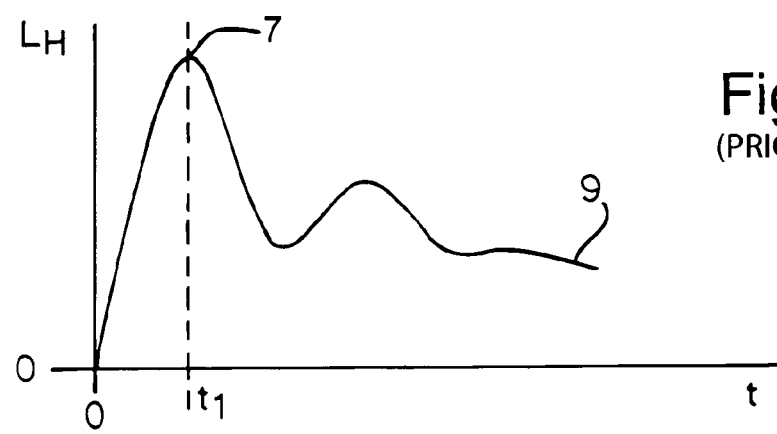

With reference to FIG. 2b, the horizontal drag loads, $L_H$, increase from zero to a peak 7. The horizontal drag load sustained by the landing gear is about 50% of the vertical loads at their peak 5 (equivalent to a force of about 60% of the weight of the aircraft). The total horizontal load on each main landing gear 4 is therefore about 0.3 Mg. During this time the wheels 2 of the main landing gear 4 are caused to rotate from zero angular velocity to an angular velocity such that the speed of the tyres at the periphery is substantially equal to the relative speed of the aircraft 1 and the runway 3 (i.e. substantially full traction). The tyres of the wheels 2 take about half a second to complete the spin-up phase. Initially there is low traction and high slip. The peak 7 of the horizontal load $L_H$ occurs at about the same time $t_1$ as the completion of the spin-up phase. As can be seen from FIGS. 2a and 2b, the peak 7 of the horizontal load $L_H$ also occurs at substantially the same time as the peak 5 of the vertical load $L_V$, that is at time $t_1$.

At the end of the spin-up phase (after time $t_1$) a phenomenon known as 'spring-back' occurs. 'Spring-back' may be considered as the effect resulting from resilience in the structures of the landing gear and wheels. For example, the landing gear itself may flex until such time as the wheels are able to "catch up" with the aircraft. Also the periphery of the tyres of the wheels may be effectively wound up like a torsion spring, that is, during slip of the periphery of the wheel with the runway the tyre "winds up" like a torsion spring because the wheel hub tends not to accelerate as rapidly as the periphery of the tyre. When the tyre has sufficient traction with the runway, the "wound up" tyre effectively unwinds.

The drag force $L_H$ decreases after peak 7, then increases slightly and then decreases again (see portion 9 of the graph of FIG. 2b) at which time there is near full traction. At time $t_2$ (about ten seconds and not included in the illustrated graphs), the brakes are applied to the wheels 2 of the landing gear 4 and thus the horizontal drag load $L_H$ rapidly increases. The peak drag load after time $t_2$ (due to conventional braking) is equal to about 25% of the mass of the aircraft (about 0.125 Mg per set of main landing gear 4).

Figure 2C:
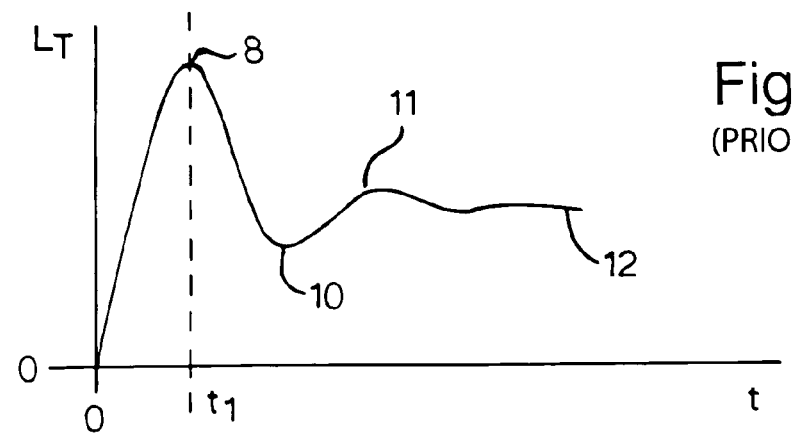

The effect of the combination of the loads $L_V$ and $L_H$ are shown schematically in FIG. 2c. Given that the peaks 5, 7 of the vertical loads $L_V$ and the horizontal loads $L_H$ occur substantially simultaneously, the combination of the vertical and horizontal loads $L_V$, $L_H$ expressed as the notional total load, $L_T$, sustained by the landing gear 4 also has its peak 8 at time $t=t_1$ (see FIG. 2c). Thereafter, the total load $L_T$ reduces to a trough 10, increases to a further peak 11, reduces to a further portion 12. At time $t_2$ (not shown) the brakes are applied and the total load $L_T$ rises rapidly.

Figure 3A:
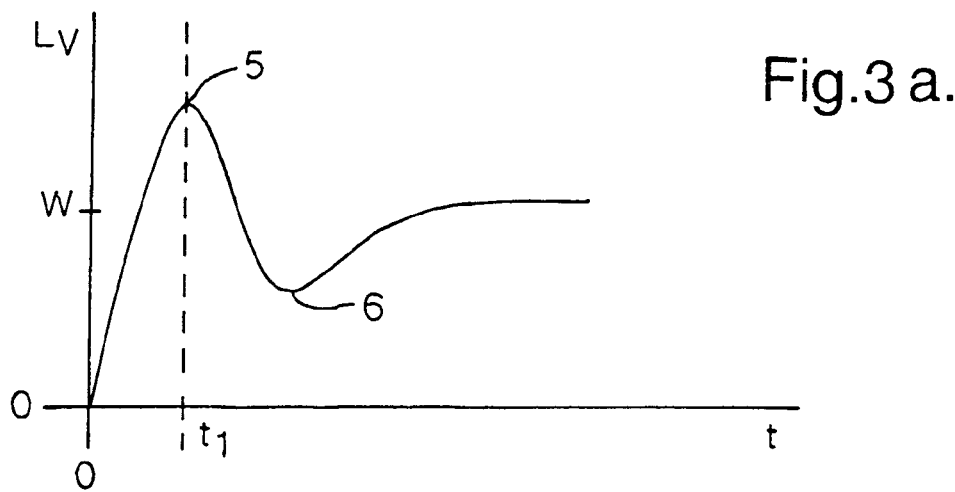
FIGS. 3a to 3c are graphs, which show schematically the loads sustained by the aircraft when landing in accordance with an embodiment of the invention.
Figure 3B:
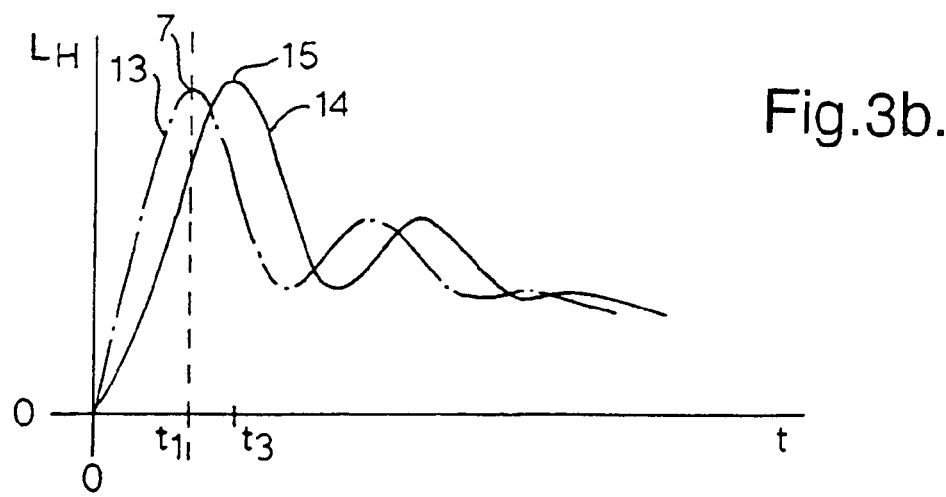
Figure 3C:
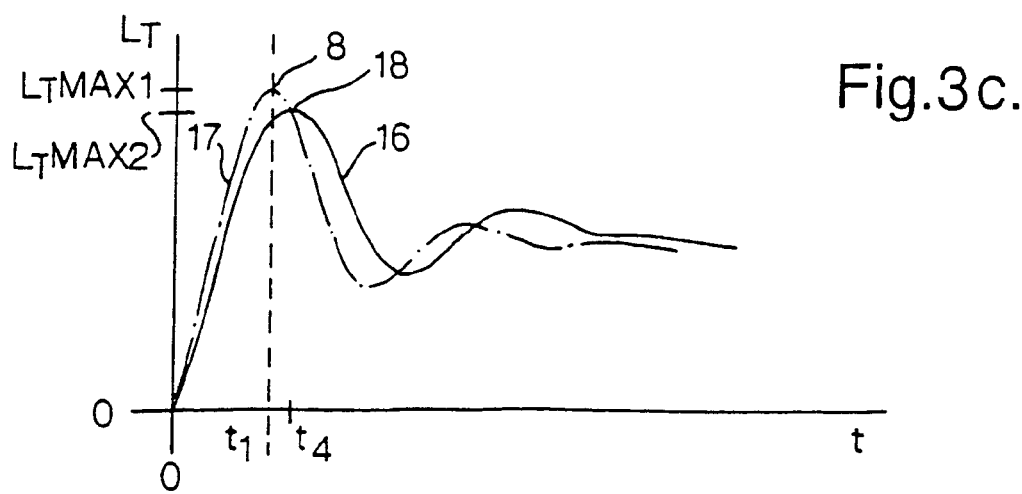

FIGS. 3a to 3c show the loads $L_V$, $L_H$, $L_T$ that are sustained by the aircraft 1 during a method of landing as performed in accordance with the embodiment of the present invention. The loads shown in the graphs of FIGS. 3a to 3c correspond to loads shown in the graphs of FIGS. 2a to 2c, respectively.

The method of the embodiment is performed such that the brakes are applied before the wheels of the main landing gear touch the runway on landing, the brakes then being released in a controlled manner over a short length of time. The brakes are applied for a total of about 0.2 seconds during contact of the wheels with the runway. The maximum braking torque applied for each set of main landing gear 4 (the sum of the torques applied for all four of the wheels on the landing gear) during that time is about 10,000 lbs ft (i.e. about 14,000 Nm), which represents about a third of the total maximum braking applied during conventional landing. (Thus a torque of 2,500 lb ft is applied to each wheel on the main landing gear resulting in a sum braking torque of 20,000 lb ft.) A sensor able to measure the vertical load sustained by the wheels detects when the wheels touch the runway and is thereby able to assess, with reasonable accuracy, the start of the spin-up phase. As soon as the spin-up phase is determined to have started, the braking force is ramped down, that is, it is reduced progressively at a constant rate from the maximum force to zero within about 0.2 seconds. As a consequence, the completion of the spin-up phase is delayed although the maximum drag load $L_H$ sustained at completion of the spin-up phase is slightly greater than if the brakes were not applied. After a given period of time the brakes are applied, under the control of the pilot, using an automated braking system. The brakes used during the spin-up phase are the same brakes as those used to decelerate the aircraft in the conventional manner. The braking applied during the spin-up phase is performed completely automatically. In the embodiment of the invention, when decelerating the aircraft after the spin-up phase, the brakes are applied at substantially the same time (time $t_2$) as that in the prior art case described above with reference to FIGS. 2a to 2c. Of course the time when the brakes are applied at this stage may be at the discretion of the pilot of the aircraft or under the control of an automated braking system.

FIG. 3a shows the vertical tyre-to-ground load and has substantially the same shape as that of FIG. 2a, in that the load reaches a maximum at time $t_1$ (peak 5) and a minimum thereafter at trough 6.

FIG. 3b shows the horizontal drag loads $L_H$ against time t as line 14 and, by way of comparison, shows as a broken line 13, the graph of FIG. 2b. As can be seen from FIG. 3b, the peak 15 (at time $t_3$) of the horizontal drag load $L_H$ occurs later than that shown in FIG. 2b and the peak load is at a slightly higher level than that shown in FIG. 2b (compare peak 15 with peak 7). The completion of the spin-up phase is delayed. Springback therefore occurs later than in the example shown in FIGS. 2a to 2c. The brakes are thereafter applied to the wheels to decelerate the aircraft in a conventional manner (not shown in FIG. 3b).

The combination of the vertical and horizontal loads $L_V$ and $L_H$ expressed as the total load $L_T$ sustained by the landing gear is shown in FIG. 3c as line 16 together with the corresponding line 17 (shown as a broken line) of FIG. 2c, for ease of comparison. As can be seen from FIG. 3b although the maximum drag load $L_H$ is greater than the corresponding maximum shown in FIG. 2b, the peak 15 of the horizontal drag load $L_H$ occurs significantly after the peak of the vertical wheel to ground loads $L_V$ (i.e. the peaks are decoupled). Thus the combination $L_T$ shown in FIG. 3c of the vertical and horizontal loads $L_V$, $L_H$ has a peak 18 that occurs at time $t_4$ ($t_1 < t_4 < t_3$) with a maximum load $L_{TMAX2}$ that is significantly lower than the corresponding maximum load $L_{TMAX1}$ of peak 8 of the graph relating to the prior art shown in FIG. 2c. Thus, it can be seen the maximum loads sustained by the landing gear 4 during landing can be reduced by landing in accordance with the method of the present embodiment of the invention.

Whilst in FIG. 3b the peak 15 of the horizontal drag load is at a higher level than the corresponding peak 7 of FIG. 2b, it may be the case that the peak drag load (peak 15) that occurs when the method of the invention is performed is at a level lower, or substantially the same as, the level of peak 7. This may be the case particularly where double axle trailing link landing gear is provided.

It will be appreciated that the graphs of FIGS. 2a to 2c and FIGS. 3a to 3c are highly schematic, and are not drawn to scale (although a given point along the time axis is representative of the same time in each of the graphs). In particular, the combination $L_T$ of the vertical loads $L_V$ and horizontal loads $L_H$ are shown in such a way as to accentuate the various differences between the graph shown in FIG. 3c in accordance with the embodiment of the present invention and the graph shown in FIG. 2c (showing the prior art) simply to help illustrate those differences clearly.

Various simulations have been carried out to assess the performance of the present invention. The simulations were all carried out in respect of the landing of an aircraft having a mass of about 60 tonnes (130,000 lbs), a horizontal speed of about 240 km/hour (130 knots) and a vertical speed of about 2.5 m/sec (8.5 ft/sec). The landing gear comprise a pair of 4-wheeled main landing gear of the double trailing link gear type and a twin wheeled nose gear (i.e. in tricycle layout). Each main landing gear of the aircraft thus comprises two axles carrying rear and front wheels. The wheels each have a mass of 95 Kg (made up of a 40 Kg tyre, 39 Kg wheel hub and 16 Kg of brake components), a diameter of 0.91 m, and a moment of inertia of 5.1 Kg m². The orientation of the aircraft on landing was assumed to be 4° nose up. The simulation was run in respect of a single set of main landing gear. The simulation assumes that the brakes are applied immediately before touch down, the brakes being ramped off at a constant rate, as soon as spin-up starts, to zero braking force over a period of 0.5 seconds. The simulation was performed in respect of a case with no braking during the spin-up phase, and four cases of braking during the spin-up phase, the sum of the initial braking torque applied to all 8 wheels being 5,000 lbs ft, 10,000 lbs ft, 20,000 lbs ft and 30,000 lbs ft, respectively. In the case where no braking was applied during the spin-up phase, the first maximum of the drag force and the vertical ground-to-tyre loads were substantially simultaneous. In the case where 5,000 lbs ft braking was applied, the maximum drag force occurred almost immediately after the vertical maximum force (at a time when the vertical load is at about 95% of its maximum value). In the case of 10,000 lbs ft braking, the maximum drag load occurs later again, at a time where the vertical load is at about 90% of its peak value reached prior to that instant. In the case of 20,000 lbs ft braking, the drag load maximum occurs significantly after the vertical load maximum and at a time when the vertical load is at about 80% of it maximum value. In the case where 30,000 lbs ft of braking are applied, it was found that other factors reduced the benefit of the present invention, although the horizontal drag load maximum occurred very much later than the first vertical load maximum.

As mentioned above, the simulations were carried out in respect of an aircraft having a trailing link landing gear having two axles including both front and rear wheels. A surprising result of the simulations is that, by applying braking during the spin-up phase, the maximum drag load resulting from the drag loads of the front and rear wheels respectively reduced as a result of the braking, the reduction possibly resulting from a decoupling of the peaks of the drag loads sustained by the front and rear wheels, respectively. Thus, whereas where no braking is applied during the spin-up phase the maximum drag load sustained by the front and rear wheels respectively occurs at substantially the same time, when a braking force of 5,000 lbs ft is applied the peaks are decoupled slightly, and, at a braking force of 10,000 lbs ft, the peaks are separated by a time of about 20% of the time taken to reach to first maximum. In the case of 20,000 lbs ft braking, the difference in timing of the front and rear wheel peak drag forces is even greater and the separation in the times of the two maxima for the front and rear wheels respectively is over 40% of the time taken to reach the first maximum. The separation in the maxima is not as marked in the case of 30,000 lbs ft braking.

It thus seems for these and other reasons that the case of 20,000 lbs ft braking is better than either 10,000 or 30,000 lbs ft braking in the context of the simulations conducted. When full braking is applied when decelerating, in a conventional manner, an aircraft having the characteristics of the aircraft simulated, a total braking force of about 50,000 to 65,000 lbs ft braking is applied (the sum of the torques applied to all eight wheels of the main landing gear) during maximum braking.

The method according to the embodiment of the invention may be performed using a standard aircraft with a standard brake system modified so as to apply the brakes automatically immediately before the wheels touch the surface of the runway on landing. Thus there is no need for the structure of the aircraft to be changed in order to perform the method of the embodiment of the invention. However, by landing in accordance with that method it may be possible to redesign the landing gear, in view of the reduction in loads normally sustained by the landing gear during landing, in such a way as to reduce the total mass of the landing gear and therefore reduce the mass of the aircraft. Sensors that are conventionally used in relation to anti-skid systems may be used to advantage in the present embodiment to monitor the spin-up of the wheels (i.e. immediately after the wheels touch down onto the runway) to assist the automatic braking effected in accordance with the embodiment.

The invention is particularly, but not exclusively, applicable to larger aircraft such as passenger-carrying aeroplanes or freight-carrying aeroplanes. Such aircraft have a mass of between about 40 tonnes and about 200 tonnes, or more. The invention may also be used to advantage in relation to other mass-critical aircraft, such as military aircraft designed to be highly manoeuvrable (for example fighter aircraft).

It will be appreciated that various modifications could be made to the above-described embodiment without departing from the scope of the present invention. For example, the main landing gear may each have only one axle.

The invention claimed is:

1. A method of landing an aircraft having wheels enabling the aircraft to land on a landing surface, said wheels having a spin-up phase on contact with the landing surface, the method comprising the step of applying a braking force to the wheels at least during a portion of spin-up of the wheels so as to delay the completion of the spin-up of the wheels.

2. A method according to claim 1, wherein the step of applying a braking force is started before the wheels touch the landing surface on landing.

3. A method according to claim 1, wherein the spin-up phase without breaking has a duration and said step of applying a braking force is performed such that the braking force is applied, during contact of the wheels with the landing surface, for a period of between 10% and 50% of the total time required, absent such braking, for completion of the spin-up phase.

4. A method according to claim 1, wherein, during the step of applying a braking force, the braking force applied is progressively reduced.

5. A method according to claim 1, wherein the step of applying a braking force is performed such that at the instant when a maximum force, due to the total drag between the wheels and the landing surface, is sustained by the aircraft, a vertical ground-to-wheels load sustained by the aircraft is below 90% of a maximum ground-to-wheels vertical load prior to that instant.

6. A method according to claim 1, wherein the method includes a step in which the aircraft is decelerated by applying a braking force after the spin-up phase has been completed and the method is performed such that the maximum braking force applied during that step is greater than twice the maximum braking force applied during the step of applying a braking force to delay completion of the spin-up of the wheels.

7. A method according to claim 1, wherein the step of applying a braking force is effected by a braking system provided for decelerating the aircraft on landing and the method includes a further step in which after the wheel spin-up phase has been completed the braking system applies a further braking force to the wheels.

8. A method according to claim 1, wherein the aircraft includes landing gear having front and rear axles, wherein during the spin-up phase the respective forces sustained by the aircraft due to the drag between the landing surface and the wheels on the front and rear axles, respectively, reaches a maximum at a first time and at a second time, respectively, and wherein the step of applying a braking force to delay completion of the spin-up of the wheels is performed such that the difference in the first and second times is greater than 10% of the time for the spin-up of the first axle spin-up phase.

9. An aircraft, wherein the aircraft is arranged to be able to land in accordance with the method of claim 1.

10. An aircraft including
wheels enabling the aircraft to land on a landing surface,
brakes able to apply a braking force to the wheels, and
a control system for controlling the braking force so applied, wherein
the aircraft is designed to land in a manner that causes the wheels to have a spin-up phase on contact with the landing surface during landing, and the control system causes the brakes to apply a braking force to the wheels so as to delay completion of the spin-up of the wheels.

11. An aircraft according to claim 10, wherein the control system is connected to a sensor able to detect the wheel-to-ground load sustained by at least one of the wheels.

12. A method of converting an existing aircraft, the existing aircraft including a landing procedure control system connectable to the existing brake system of that aircraft, the method including the steps of converting the landing procedure control system to a control system as claimed in claim 10.

* * * * *